(12) United States Patent
Patel et al.

(10) Patent No.: US 10,234,064 B2
(45) Date of Patent: Mar. 19, 2019

(54) VARIABLE FRICTION COUPLING ASSEMBLY

(71) Applicant: SPS TECHNOLOGIES, LLC, Jenkintown, PA (US)

(72) Inventors: Nilesh Patel, Irvine, CA (US); Kevin Proschold, Anaheim, CA (US); Ismael Pacheco, Mission Viejo, CA (US)

(73) Assignee: SPS TECHNOLOGIES, LLC, Jenkintown, PA (US)

( * ) Notice: Subject to any disclaimer, the term of this patent is extended or adjusted under 35 U.S.C. 154(b) by 226 days.

(21) Appl. No.: 15/286,641

(22) Filed: Oct. 6, 2016

(65) Prior Publication Data

US 2018/0100610 A1 Apr. 12, 2018

(51) Int. Cl.
 *F16L 37/088* (2006.01)
(52) U.S. Cl.
 CPC .................... *F16L 37/088* (2013.01)
(58) Field of Classification Search
 CPC ...... F16L 37/086; F16L 37/088; F16L 37/091
 USPC .................... 285/82, 85, 86, 89, 92
 See application file for complete search history.

(56) References Cited

U.S. PATENT DOCUMENTS

| | | | | |
|---|---|---|---|---|
| 5,127,679 A * | 7/1992 | Pouplier | ............... | F16L 19/005 285/86 |
| 5,215,336 A * | 6/1993 | Worthing | ............. | F16L 19/005 285/319 |
| 5,350,200 A * | 9/1994 | Peterson | ............. | F16L 19/0225 285/330 |
| 7,156,424 B2 * | 1/2007 | McCord | ................ | F16L 19/005 285/319 |
| 7,571,937 B2 * | 8/2009 | Patel | ..................... | F16L 19/005 285/386 |
| 8,523,240 B2 * | 9/2013 | Murphy | ................ | F16L 19/005 285/386 |
| 8,555,765 B2 * | 10/2013 | Graham, II | ........... | F41A 21/325 285/92 |
| 8,992,148 B2 * | 3/2015 | Schafer | ................ | H01R 13/622 285/92 |
| 9,163,758 B2 * | 10/2015 | Marc | ...................... | F16L 19/005 |
| 9,188,261 B2 * | 11/2015 | Marc | ...................... | F16L 19/005 |
| 9,279,526 B2 * | 3/2016 | McAlister | ........... | F16L 19/0231 |
| 9,951,895 B2 * | 4/2018 | Petrarca | .................. | F16L 15/08 |
| 2002/0089176 A1 * | 7/2002 | Iwasaki | ................. | G02B 7/022 285/92 |
| 2004/0017077 A1 * | 1/2004 | Vyse | ..................... | F16L 19/005 285/92 |
| 2013/0145607 A1 * | 6/2013 | Murphy | ................ | F16L 15/08 29/525.11 |
| 2014/0284918 A1 * | 9/2014 | Kumar | .................. | F16L 19/025 285/92 |

* cited by examiner

*Primary Examiner* — Aaron M Dunwoody
(74) *Attorney, Agent, or Firm* — Burris Law, PLLC

(57) ABSTRACT

A ferrule for connecting two adjacent components is provided, wherein the ferrule defines an exterior wall portion having a plurality of asymmetrical dimples. Each asymmetrical dimple has at least two sidewalls, and one sidewall defines a first ramp angle, and the other sidewall defines a second ramp angle that is steeper than the first ramp angle. At least one feature of one of the adjacent components engages the plurality of asymmetrical dimples such that the sidewall with the first ramp angle provides less force in an engaging direction and the sidewall with the second ramp angle provides more force in a disengaging direction.

20 Claims, 8 Drawing Sheets ously, the plural of lobes comprise at least two primary lobes disposed at end portions
VARIABLE FRICTION COUPLING ASSEMBLY

FIELD

The present disclosure relates to couplings and more specifically to couplings having resistance to rotation and vibration.

BACKGROUND

The statements in this section merely provide background information related to the present disclosure and may not constitute prior art.

Mechanical couplings and fluid conduits are used in a variety of applications. In fluid applications, adjacent components are mechanically coupled to allow fluid to flow through the adjacent components, preferably without leaking. Typical mechanical couplings include a threaded connection, where seals between the adjacent components are accomplished via tapered interfaces and are preloaded by tightening the threaded connection. Stress, vibration, movement, flexing, and other cyclical or dynamic forces can cause a loosening of a coupled connection, resulting in the reduction of a desired sealing torque. This reduction in torque can result in leaks, a drop in pressure, and other undesirable effects.

Loosening of a fluid-transmitting connection can be a particular problem for pneumatic and hydraulic connectors. These connectors are subject not only to external forces, but are also subjected to internal pressure/stress from the fluid being conducted through the coupling. Numerous approaches to addressing these problems exist in the art, including the use of adhesive materials and lock wires to prevent loosening of the coupling. In the aircraft industry, for example, many fluid coupling joints have included compression fittings secured with threaded connections, where a nut is lock-wired to a mating connecting component such that the nut cannot turn with respect to the fitting.

SUMMARY

The present disclosure provides a coupling assembly comprising a nut assembly having a nut body with a nut portion and a shaft portion extending from the nut portion. The nut portion defines an opening extending around an interior portion thereof, and a resilient lock ring is retained within the opening of the nut portion, the resilient lock ring defining a plurality of lobes. A ferrule is adapted for engagement within the opening of the nut portion, the ferrule defining an exterior wall portion having a plurality of asymmetrical dimples, each asymmetrical dimple having at least two sidewalls, wherein one sidewall defines a first ramp angle, and the other sidewall defines a second ramp angle that is steeper than the first ramp angle. The plurality of lobes of the resilient lock ring engage the plurality of asymmetrical dimples such that the sidewall with the first ramp angle provides less force in an engaging direction and the sidewall with the second ramp angle provides more force in a disengaging direction.

In another form, a ferrule for connecting two adjacent components is provided, the ferrule defining an exterior wall portion having a plurality of asymmetrical dimples, each asymmetrical dimple having at least two sidewalls, wherein one sidewall defines a first ramp angle, and the other sidewall defines a second ramp angle that is steeper than the first ramp angle. At least one feature of one of the adjacent components engages the plurality of asymmetrical dimples such that the sidewall with the first ramp angle provides less force in an engaging direction and the sidewall with the second ramp angle provides more force in a disengaging direction.

In variations of the present disclosure, which may be employed alone or in combination, the plurality of lobes comprise at least two primary lobes disposed at end portions of the resilient lock ring and at least two secondary lobes disposed radially along the resilient lock ring from each of the primary lobes, wherein the primary lobes are larger than the secondary lobes. The resilient lock ring may be welded to the nut body, or it may be swaged to the nut body. The ferrule may further include a circumferential groove disposed around an exterior portion thereof, the nut body comprises an internal circumferential shoulder, and the coupling assembly further comprises a thrust wire disposed within the circumferential groove of the ferrule, wherein the thrust wire engages the internal circumferential shoulder of the nut body to retain the nut assembly to the ferrule. Alternately, the ferrule may comprise an external shoulder and the nut body comprises an internal groove, wherein the external shoulder of the ferrule engages the internal groove of the nut body to retain the nut assembly to the ferrule.

In one form, a spring rate of the resilient lock ring and the first and second ramp angles are configured to provide predetermined torques when engaging and disengaging the nut assembly with the ferrule. In another form, the resilient lock ring is disposed proximate an end portion of the nut body such that the primary and secondary lobes engaging the plurality of asymmetrical dimples are exposed so as to provide a visual indication to a user that the coupling assembly is properly assembled.

Further areas of applicability will become apparent from the description and figures provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
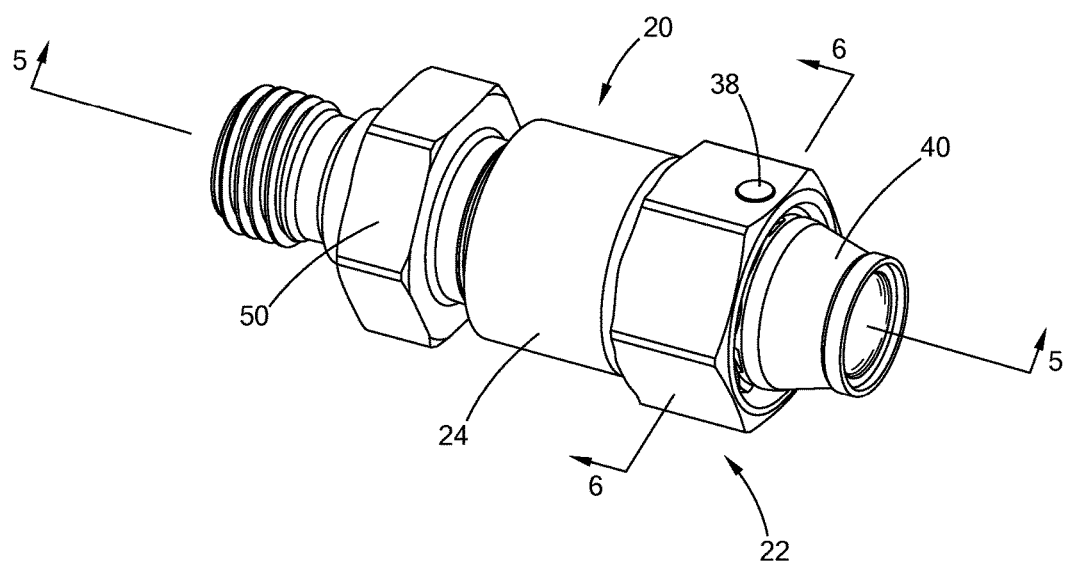
FIG. 1 is a perspective view of a coupling assembly constructed in accordance with the principles of the present disclosure.
Figure 2:
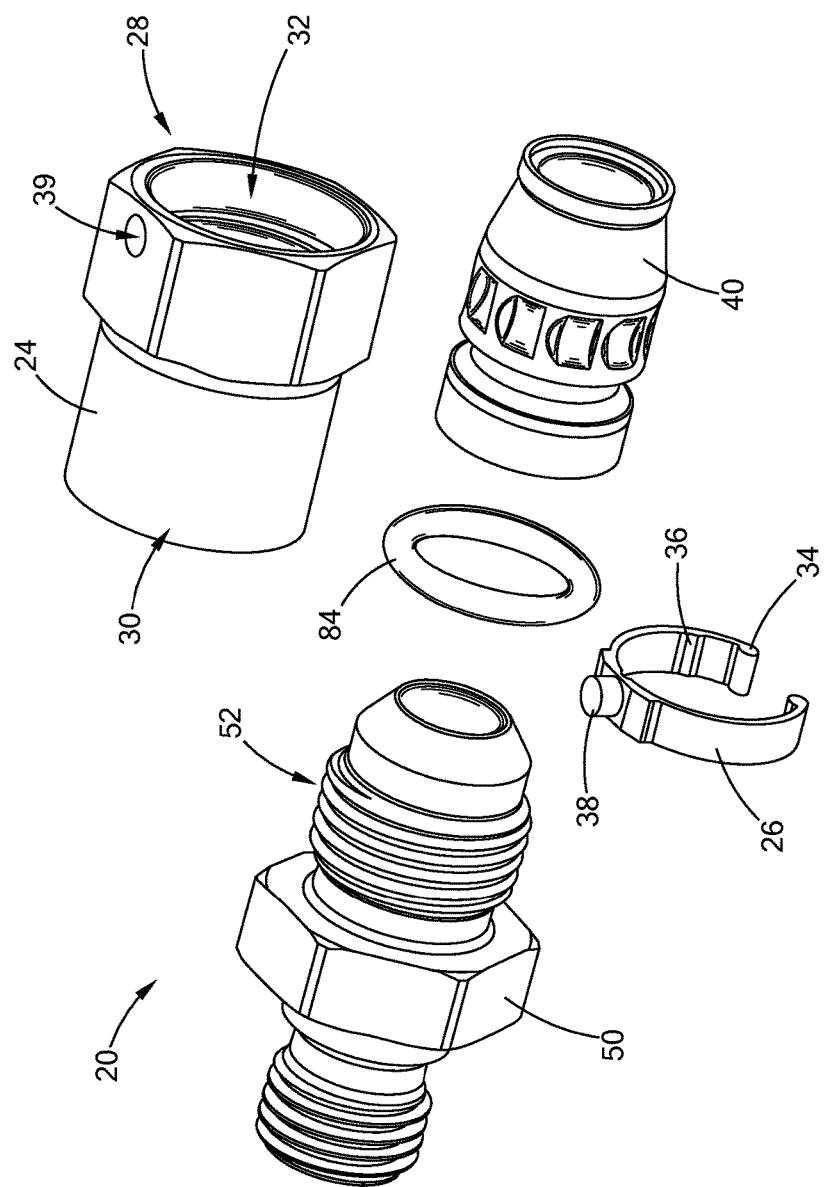
FIG. 2 is an exploded view of various components of the coupling assembly constructed in accordance with one form of the present disclosure.
Figure 3:
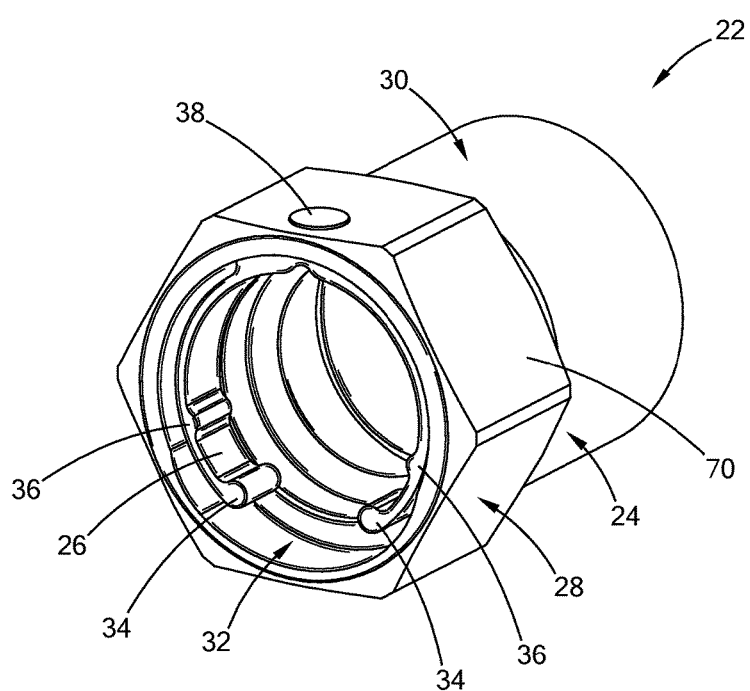
FIG. 3 is a perspective view of a nut body and resilient lock ring retained therein and constructed in accordance with the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIGS. 1 through 5, a coupling assembly is illustrated and generally indicated by reference numeral 20. The coupling assembly 20 comprises a nut assembly 22 (best shown in FIG. 3), which includes a nut body 24 and a resilient lock ring 26 retained within the nut body 24. More specifically, the nut body 24 includes a nut portion 28 and a shaft portion 30 extending from the nut portion 28. The nut portion 28 defines an opening 32 extending around an interior portion thereof, and the resilient lock ring 26 is retained within the opening 32 as described in greater detail below. The nut portion 28 also at least one external tool engagement feature, which in this form is a hex configuration as shown. It should be understood, however, that alternate features that allow for a tool, or manual, engagement in order to engage and disengage the nut assembly 22 may be provided while remaining within the scope of the present disclosure.

The resilient lock ring 26 includes a plurality of lobes, and in one form includes primary lobes 34 and secondary lobes 36. In this form, at least two primary lobes 34 are disposed at end portions of the resilient lock ring 26, and at least two secondary lobes 36 are disposed radially along the resilient lock ring from each of the primary lobes 34, wherein the primary lobes 34 are larger than the secondary lobes 36. The primary lobes 34 and the secondary lobes 36 are rounded as shown in order to provide more ease of use and durability. Further functions of the lobes 34/36 are described in greater detail below with reference to engaging and disengaging the coupling assembly 20.

In one form, the resilient lock ring 26 includes a tab 38 that extends through an aperture 39 in the nut portion 28 as shown in order to retain the resilient lock ring 26 within the nut assembly 22. In other forms, the resilient lock ring 26 may be welded to the nut body 24 or swaged to the nut body 24 in order to retain the resilient lock ring 26 while remaining within the scope of the present disclosure. Further, the resilient lock ring 26 may be constructed of a variety of materials, including metals, polymers, and composites, and combinations thereof, provided the resilient lock ring 26 is elastically deformable during engagement and disengagement as described in greater detail below. Additional details of a resilient lock ring and variations thereof are described in U.S. Pat. No. 9,255,655, which is commonly assigned with the present application and the entire contents of which are incorporated herein by reference in their entirety.

Figure 4:
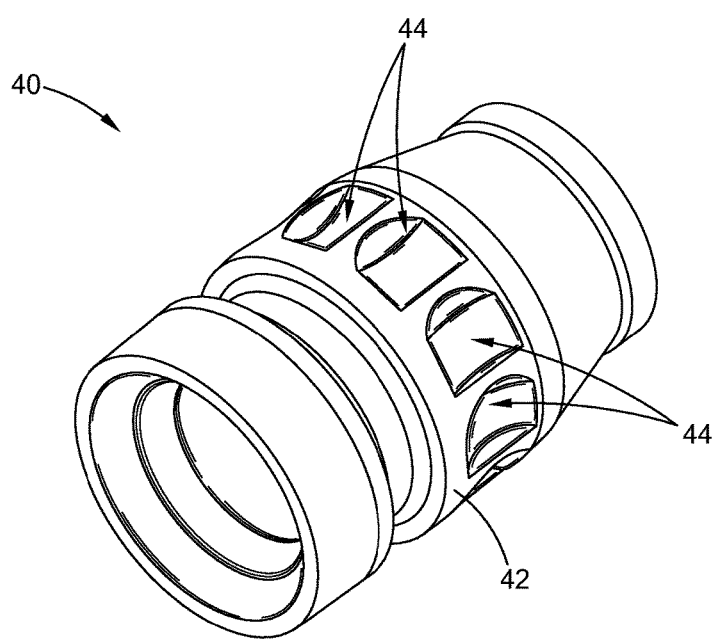
FIG. 4 is a perspective view of a ferrule constructed in accordance with the principles of the present disclosure.
Figure 6:
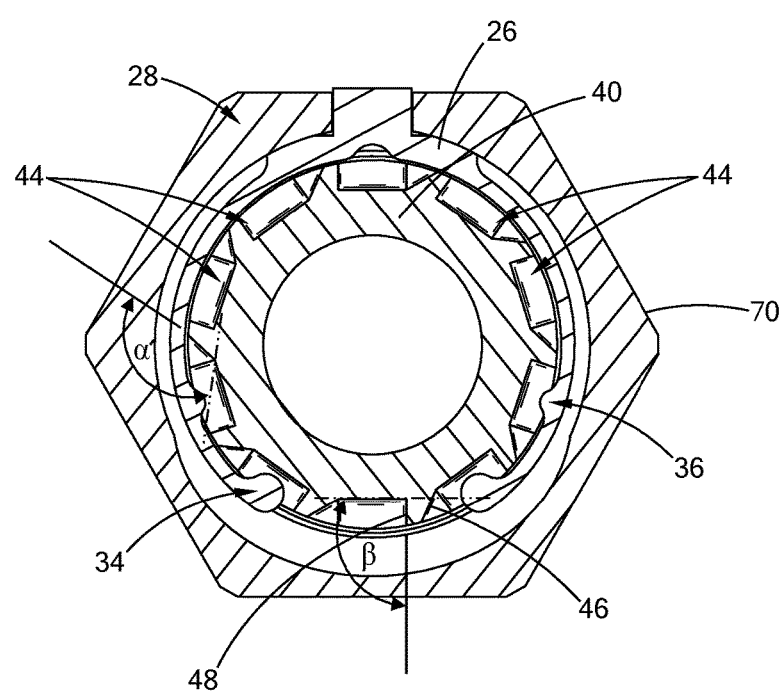
FIG. 6 is cross-sectional view, taken along line 6-6 of FIG. 1, illustrating the resilient lock ring engaging asymmetrical dimples of the ferrule and constructed in accordance with the principles of the present disclosure.

Referring also to FIGS. 4 and 6, the coupling assembly 20 further includes a ferrule 40, which is adapted for engagement within the opening 32 of the nut portion 28. In one form, the ferrule 40 defines an exterior wall 42 having a plurality of asymmetrical dimples 44. Each asymmetrical dimple 44 has at least two sidewalls 46, 48, wherein one sidewall defines a first ramp angle $\alpha$ (alpha), and the other sidewall defines a second ramp angle $\beta$ (beta) that is steeper than the first ramp angle. In one form as shown, the second ramp angle $\beta$ (beta) is approximately 90° as shown. Also, for purposes of clarity, the ramp angle is measured relative to a tangent line as shown by phantom lines in FIG. 6. Therefore, a "shallower" ramp angle as used herein, while resulting in a larger angular measurement, (i.e., $\alpha$ (alpha) being greater than $\beta$ (beta) as shown) means that the angle at which the lobes 34/36 meet the walls 46 and 48 when the nut assembly 22 is rotated is more gradual, or more shallow, as illustrated herein. The plurality of asymmetrical dimples 44 may be evenly spaced as shown, or alternately, the asymmetrical dimples 44 may have a different spacing and/or size while remaining within the scope of the present disclosure.

Figure 5:
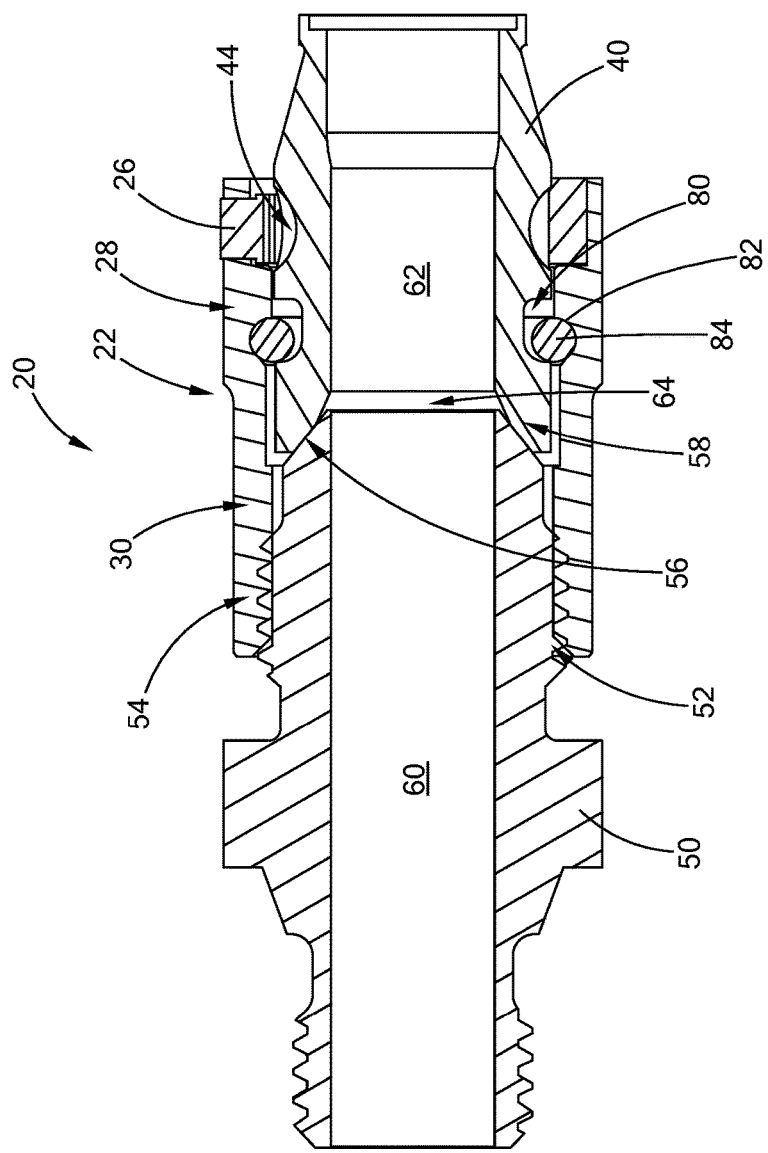
FIG. 5 is a cross-sectional view of the coupling assembly of FIG. 1, taken along line 5-5.

Referring to FIGS. 5 and 6, the ferrule 40 is disposed within the opening 32 of the nut portion 28, and an adjacent component such as a fitting 50 is engaged with the shaft portion 30. More specifically, in this form, the fitting 50 comprises at least one threaded portion 52 and the shaft portion 30 comprises a mating threaded portion 54 such that the nut assembly 22 can be secured to the fitting 50. Also, the fitting 50 comprises a tapered end surface 56, and the ferrule 40 comprises a mating tapered end surface 58 such that the fitting 50 can be more easily mated to, and sealed against, the ferrule 40 when the fitting 50 is threadedly engaged with the nut assembly 22. As shown, the threaded portion 52 of the fitting 50 is on an exterior portion thereof, and the mating threaded portion 54 of the shaft portion 30 of the nut assembly 22 is on an interior portion thereof. It should be understood, however, that alternate threaded engagements may be employed while remaining within the scope of the present disclosure.

As shown in this form, the fitting 50, the ferrule 40, and the nut body 24 each comprise an internal bore 60, 62, and 64, respectively, which are in fluid communication with each other for a fluid application. It should be understood, however, that the teachings of the present disclosure are not limited to fluid fitting applications and may be applied to a variety of couplings in which an anti-rotation feature is desired.

With the fitting 50 and the ferrule 40 engaged within the nut assembly 22, as the nut portion 28 is rotated clockwise, the plurality of lobes 34/36 of the resilient lock ring 26 engage the plurality of asymmetrical dimples 44 such that the sidewall with the first ramp angle 46 provides less force in an engaging (clockwise in this illustrative form) direction and the sidewall with the second ramp angle 48 provides more force in a disengaging (counterclockwise in this illustrative form) direction. It should be understood, however, a counterclockwise direction may be the engaging direction while a clockwise direction may be a disengaging direction while remaining within the scope of the present disclosure. In such a case, the sidewalls 46 and 48 would be switched such that the first ramp angle is steeper than the second ramp angle.

The nut portion 28 includes an external engagement feature 70, which in this form is a hex configuration. However, it should be understood that other engagement features may be provided while remaining within the scope of the present disclosure.

With this innovative combination of lobes 34/36 and dimples 44 having sidewalls with different ramp angles, an anti-rotation feature is provided by having a steeper ramp angle to be overcome by the lobes 34/36 when disengaging the coupling assembly 20. The torque generated when engaging and disengaging the ferrule 40 is a function of the spring rate of the resilient lock ring 26, and thus the first ramp angle $\alpha$ (alpha) and the second ramp angle $\beta$ (beta) are configured to provide predetermined torques when engaging and disengaging the nut assembly 22 with the ferrule 40. Further, the shallower first ramp angle α (alpha) in the engagement direction gently expands the resilient lock ring 26 such that the torque required to overcome the angle of the first sidewall 46 is primarily due to friction, while the torque required to overcome the angle of the second sidewall 48 and expand the resilient lock ring 26 further is even greater, thus providing an anti-rotation feature.

More specifically, the primary lobes 34 tend to self-energize and resist disengaging the dimples 44, while the secondary lobes 36 help to initiate expansion of the resilient lock ring 26 in the disengaging direction so that a locking torque is not too high so as to prevent disassembly of the coupling assembly 20.

Referring back to FIG. 5, the ferrule 40 further comprises a circumferential groove 80 disposed around an exterior portion thereof, the nut body 24 comprises an internal circumferential shoulder 82, and the coupling assembly 20 further comprises a thrust wire 84 disposed within the circumferential groove 80 of the ferrule 40. The thrust wire 84 engages the internal circumferential shoulder 82 of the nut body 24 to retain the nut assembly 22 to the ferrule 40.

Figure 7:
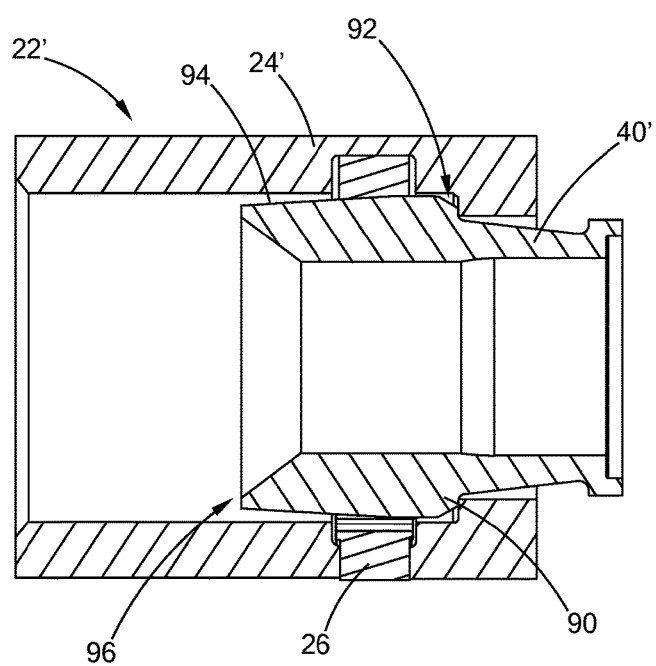
FIG. 7 is a detail cross-sectional view illustrating an alternate form of engaging the ferrule and the nut without a thrust wire and constructed according to the teachings of the present disclosure.

In an alternate form as shown in FIG. 7, the ferrule 40' comprises an external shoulder 90 and the nut body 24' comprises an internal shoulder 92, wherein the external shoulder 90 of the ferrule engages the internal shoulder 92 of the nut body 24' to retain the nut assembly 22' to the ferrule 40'. With this form, the thrust wire 84 may be eliminated. As further shown, the ferrule 40' comprises an external tapered surface 94 around an end portion thereof. When an adjacent component (such as the fitting 50, not shown here) is engaged within the ferrule 40' and the nut assembly 22' is tightened, a distal end 96 of the ferrule 40' expands outwardly, and thus the external tapered surface 94 inhibits jamming.

Figure 8:
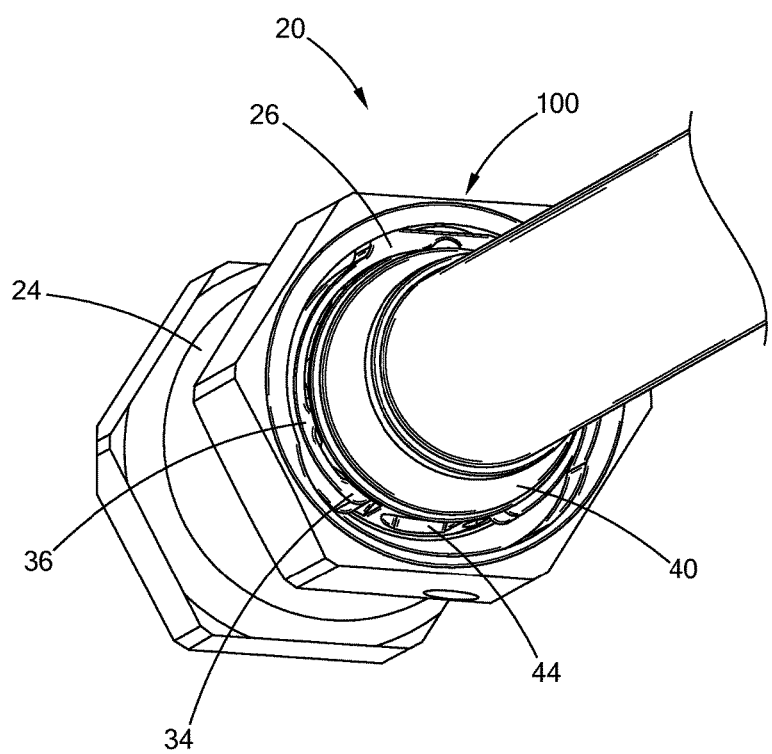
FIG. 8 is a perspective view illustrating a visual indication of the anti-rotation feature when installed according to the teachings of the present disclosure.

Referring now to FIG. 8, the resilient lock ring 26 is disposed proximate an end portion 100 of the nut body 24 such that the primary and secondary lobes 34/36 engaging the plurality of asymmetrical dimples 44 is exposed so as to provide a visual indication to a user that the coupling assembly 20 is properly assembled.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A coupling assembly comprising:
   a nut assembly comprising:
   a nut body having a nut portion and a shaft portion extending from the nut portion, the nut portion defining an opening extending around an interior portion thereof; and
   a resilient lock ring retained within the opening of the nut portion, the resilient lock ring defining a plurality of lobes; and
   a ferrule adapted for engagement within the opening of the nut portion, the ferrule defining an exterior wall portion having a plurality of asymmetrical dimples, each asymmetrical dimple having at least two sidewalls, wherein one sidewall defines a first ramp angle, and the other sidewall defines a second ramp angle that is steeper than the first ramp angle,
   wherein the plurality of lobes of the resilient lock ring engage the plurality of asymmetrical dimples such that the sidewall with the first ramp angle provides less force in an engaging direction and the sidewall with the second ramp angle provides more force in a disengaging direction.

2. The coupling assembly according to claim 1, wherein the plurality of lobes comprise at least two primary lobes disposed at end portions of the resilient lock ring and at least two secondary lobes disposed radially along the resilient lock ring from each of the primary lobes, wherein the primary lobes are larger than the secondary lobes.

3. The coupling assembly according to claim 1, wherein the resilient lock ring s welded to the nut body.

4. The coupling assembly according to claim 1, wherein the resilient lock ring is swaged to the nut body.

5. The coupling assembly according to claim 1, wherein the ferrule further comprises a circumferential groove disposed around an exterior portion thereof, and the nut body comprises an internal circumferential shoulder, and the coupling assembly further comprises a thrust wire disposed within the circumferential groove of the ferrule, wherein the thrust wire engages the internal circumferential shoulder of the nut body to retain the nut assembly to the ferrule.

6. The coupling assembly according to claim 1, wherein the ferrule further comprises an external shoulder and the nut body comprises an internal shoulder, wherein the external shoulder of the ferrule engages the internal shoulder of the nut body to retain the nut assembly to the ferrule.

7. The coupling assembly according to claim 1, wherein a spring rate of the resilient lock ring and the first ramp angle cooperate to provide a first torque when engaging the nut assembly with the ferrule, and wherein the spring rate of the resilient lock ring and the second ramp angle cooperate to provide a second torque when disengaging the nut assembly with the ferrule, the second torque being different than the first torque.

8. The coupling assembly according to claim 1, wherein the engaging direction is clockwise and the disengaging direction is counterclockwise.

9. The coupling assembly according to claim 1, wherein the resilient lock ring is disposed proximate an end portion of the nut body such that the lobes engaging the plurality of asymmetrical dimples are exposed so as to provide a visual indication to a user that the coupling assembly is properly assembled.

10. The coupling assembly according to claim 1, wherein the second ramp angle is approximately 90°.

11. The coupling assembly according to claim 1 further comprising a fitting having at least one threaded portion, and the shaft portion of the nut assembly comprising a mating threaded portion such that the nut assembly can be secured to the fitting.

12. The coupling assembly according to claim 11, wherein the fitting further comprises a tapered end surface, and the ferrule comprises a mating tapered end surface such that the fitting can be mated to the ferrule when the fitting is threadedly engaged with the nut assembly.

13. The coupling assembly according to claim 12, wherein the fitting, the ferrule, and the nut body each comprise an internal bore that are in fluid communication with each other.

14. The coupling assembly according to claim 11, wherein the threaded portion of the fitting is on an exterior portion thereof, and the mating threaded portion of the shaft portion of the nut assembly is on an interior portion thereof.

15. The coupling assembly according to claim 1, wherein the resilient lock ring comprises a tab, and the nut portion of the nut assembly comprises an aperture through which the tab is positioned to locate the resilient lock ring.

16. The coupling assembly according to claim 1, wherein the nut portion of the nut assembly comprises at least one external tool engagement feature.

17. A ferrule for connecting two adjacent components, the ferrule defining an exterior wall portion having a plurality of asymmetrical dimples, each asymmetrical dimple having at least two sidewalls, wherein one sidewall defines a first ramp angle, and the other sidewall defines a second ramp angle that is steeper than the first ramp angle,
   wherein the plurality of asymmetrical dimples are configured to engage at least one feature of one of the two adjacent components such that the sidewall with the first ramp angle provides less force in an engaging direction and the sidewall with the second ramp angle provides more force in a disengaging direction.

18. The ferrule according to claim 17, wherein the plurality of asymmetrical dimples are evenly spaced around a circumference of the ferrule.

19. The ferrule according to claim 17 further comprising an internal bore extending therethrough to accommodate a flow of fluid.

20. The ferrule according to claim 17 further comprising a sealing surface disposed at an end portion thereof.

* * * * *